US009106547B2

(12) United States Patent
Sakurai

(10) Patent No.: US 9,106,547 B2
(45) Date of Patent: *Aug. 11, 2015

(54) APPARATUS FOR CONSTRUCTING RING NETWORK

(75) Inventor: Hiroto Sakurai, Kawasaki (JP)

(73) Assignee: ALAXALA NETWORKS CORPORATION, Kanagawa (JP)

( * ) Notice: Subject to any disclaimer, the term of this patent is extended or adjusted under 35 U.S.C. 154(b) by 181 days.

This patent is subject to a terminal disclaimer.

(21) Appl. No.: 13/594,075

(22) Filed: Aug. 24, 2012

(65) Prior Publication Data

US 2012/0320734 A1 Dec. 20, 2012

Related U.S. Application Data

(63) Continuation of application No. 11/833,320, filed on Aug. 3, 2007, now Pat. No. 8,255,575.

(30) Foreign Application Priority Data

Nov. 29, 2006 (JP) ................................ 2006-321021

(51) Int. Cl.
*G06F 15/16* (2006.01)
*H04L 12/437* (2006.01)
*H04L 12/26* (2006.01)

(52) U.S. Cl.
CPC .............. *H04L 43/10* (2013.01); *H04L 12/437* (2013.01); *H04L 43/0805* (2013.01)

(58) Field of Classification Search
None
See application file for complete search history.

(56) References Cited

U.S. PATENT DOCUMENTS

| 4,577,313 | A | 3/1986 | Sy |
| 6,330,229 | B1 | 12/2001 | Jain et al. |
| 6,574,197 | B1 | 6/2003 | Kanamaru et al. |
| 6,766,482 | B1* | 7/2004 | Yip et al. ....................... 714/717 |
| 7,558,205 | B1* | 7/2009 | Moncada-Elias et al. ..... 370/236 |
| 7,898,942 | B2* | 3/2011 | Takagi et al. .................. 370/222 |
| 8,255,575 | B2* | 8/2012 | Sakurai ......................... 709/251 |
| 2004/0223503 | A1* | 11/2004 | Lynch et al. ................... 370/404 |
| 2005/0207348 | A1* | 9/2005 | Tsurumi et al. ............... 370/241 |
| 2005/0226265 | A1* | 10/2005 | Takatori ........................ 370/452 |
| 2006/0215546 | A1 | 9/2006 | Tochio |

(Continued)

FOREIGN PATENT DOCUMENTS

| EP | 1 575 221 | 9/2005 |
| JP | 2003-234747 | 8/2003 |
| JP | 2004-201009 | 7/2004 |
| JP | 2005-260927 | 9/2005 |
| JP | 2006-279279 | 10/2006 |

OTHER PUBLICATIONS ("Extreme Networks' Ethernet Automatic Protection Switching (EAPS)"; Shah, S; Yip, M; Oct. 2003; Extreme Networks).

(Continued)

*Primary Examiner* — Donald Mills
(74) *Attorney, Agent, or Firm* — Baker Botts L.L.P.

(57) ABSTRACT

A first communication apparatus to be coupled to a second communication apparatus and a third communication apparatus via a ring network, including: a first port to coupled to the ring network; and a second port to coupled to the ring network; wherein the first port and the second port is set to receive a control frame from the second communication apparatus and the third communication apparatus, and either the first port or the second port is set to be disabled to relay a user frame.

11 Claims, 13 Drawing Sheets

(56) References Cited

U.S. PATENT DOCUMENTS

2007/0104093 A1* 5/2007 Li et al. .......................... 370/223
2009/0296569 A1* 12/2009 Ramalho Ribeiro Dos Santos
et al. ............................ 370/222

OTHER PUBLICATIONS

ANSI/IEEE Std 802.1D, 1998 Edition, Part 3: Media Access Control (MAC) Bridges, 8.1 to 9.3, 1998, pp. 58-113.

* cited by examiner

APPARATUS FOR CONSTRUCTING RING NETWORK

CROSS REFERENCE TO RELATED APPLICATION

This is a continuation of U.S. application Ser. No. 11/833,320, filed Aug. 3, 2007 now U.S. Pat. No. 8,255,575. This application relates to and claims priority from Japanese Patent Application No. 2006-321021, filed on Nov. 29, 2006. The entirety of the contents and subject matter of all of the above is incorporated herein by reference.

BACKGROUND OF THE INVENTION

1. Field of the Invention

The present invention generally relates to an apparatus which provides redundancy of communication routes in a ring network. More specifically, the present invention is directed to such an apparatus capable of realizing high-speed switching of routes, and capable of simply coupling a plurality of ring networks, and also capable of independently performing operations in each of these ring networks so as to realize constructions of more flexible networks, and further, capable of reducing loads given to a CPU.

2. Description of the Related Art

While networks are constructed, there are some possibilities that a plurality of apparatuses are connected to each other in ring structures in order to make communication routes redundant. Networks having ring structures have a feature that necessary amounts of transfer routes and the like may be reduced, as compared with those of networks having mesh structures. On the other hand, since the networks are structured in ring shapes, when broadcast packets flow through the networks having the ring structures, transfer operations of these broadcast packets are repeatedly carried out in an infinite time, so that such a loop is produced in which the broadcast packets are continuously circulated in the same route for a long time. As a result, traffic loads on the networks caused by broadcast streams are increased, or CPU loads caused by unstable conditions of learning are increased, which may give adverse influences to communications. In order to avoid the occurrence of this loop, various methods capable of logically cutting off loop structures have been proposed in networks having ring structures.

In the spanning tree protocol described in IEEE Std 802.1D, 1998 Edition, such a control frame called as "BPDU" is periodically exchanged among apparatuses which construct a network in order to cut off a loop structure. While a plurality of protocol information used to determine operations of the protocol have been superimposed on the BPDU, each of these apparatuses which receive this BPDU changes logical statuses in ports which constitute a loop into blocking statuses based upon the protocol information of the received BPDU, and constructs such a network having a tree structure, so that the loop is logically cut off.

While the redundant protocol described in JP-A-2004-201009 is specifically used in a ring network, one structural apparatus among apparatuses which constitutes the ring network is defined as a monitoring apparatus, whereas other structural apparatuses are defined as relay apparatuses. In the monitoring apparatus, a control frame is periodically transmitted from an one-sided port thereof, and a reception of this transmitted is monitored at an opposite-sided port thereof. While the control frame is being received at the opposite-sided port, the monitoring apparatus transmits another control frame from this opposite-sided port, and sets the opposite-sided port to such a condition that a user frame cannot be relayed. As a consequence, the loop structure is logically cut off. If the control frame cannot be received at the opposite-sided port, then the monitoring apparatus stops the transmission of the control frame from this opposite-sided port, and permits the relay of the user frame. As a result, the communication routes can be made redundant.

Within the above-described conventional techniques, since the spanning tree protocol disclosed in IEEE Std 802.1D 1988 Edition may also be directed to complex network structures, the tree structure must be determined based upon the plurality of information superimposed on BPDU exchanged among the apparatuses, and thus, the protocol operations become complex. As a result, even when a structure of a ring network is made simple, the below-mentioned problems may occur. That is, while the structure of such a simple ring network is changed when a failure occurs and the failure is recovered within this simple ring network, and also while apparatuses are additionally conducted to the simple ring network, there are some possibilities that several tens of seconds are required until communications are stabilized, during which the communications are stopped. Also, since it is practically difficult to realize the complex protocol operations by employing hardware, these complex protocol operations are realized by employing software. As a result, if loads given to a CPU are increased, then there is another problem that an adverse influence may be given to the complex protocol operations.

SUMMARY OF THE INVENTION

Further, as to the redundant protocol described in JP-A-2004-201009 within the conventional techniques, the problems occurred in the spanning tree protocol have been solved by specifying the redundant protocol to the ring network. However, this redundant protocol has the below-mentioned problems to be solved. That is, since the control frame is transmitted from only one-sided port (namely, only one direction) of the monitoring apparatus provided in the ring network, in such a case that a failure of one direction happens to occur in a link which constitutes the ring network, the monitoring apparatus judges that a ring status is under abnormal condition, and thus, permits the opposite-sided port to relay a user frame, so that a ring status of the other direction is brought into a loop status. Furthermore, in another network structure that a plurality of ring networks are coupled to each other and coupled apparatuses become redundant, there is such a limitation that an apparatus at the coupling portion must be a monitoring apparatus. As a consequence, there is another problem to be solved that the network structure cannot have a flexible network structure. Also, as a problem specific to a ring network, in the case that the plurality of ring networks are coupled to each other and apparatuses of coupling portions are made redundant, if a failure happens to occur in a link between the apparatuses made redundant, then the following problem occurs. That is, in the coupled ring networks, there are certain possibilities that a large loop structure may be formed.

An object of the present invention has been made to solve the above-described problems, and therefore, is to provide an apparatus capable of realizing high-speed switching of communication routes, capable of preventing an occurrence of a loop which is caused by an one-directional failure of a link within a ring network, and capable of realizing a simple and flexible structure constructed by coupling a plurality of ring networks, and further, capable of avoiding a construction of a loop caused by a failure of a specific link.

To achieve the above-described object, an apparatus according to the present invention is featured as follows: That is, as apparatuses which construct a ring network, such a structure made of a monitoring apparatus and other relay apparatuses is employed. The monitoring apparatus monitors only a ring status of such a ring network to which the own monitoring apparatus belongs. The monitoring apparatus periodically transmits health check frames from ring ports thereof respectively so as to monitor whether or not the transmitted health check frame has been received by the ring port located opposite thereto. Also, in a structure of a multi-ring network having a shared link, auxiliary health check frames are periodically transmitted from two sets of shared apparatuses respectively with respect to a monitoring apparatus of a shared link non-monitored ring network. The monitoring apparatus also monitors the auxiliary health check frames in combination with the health check frames in order to avoid an occurrence of a loop which bridges a plurality of ring networks. Since the above-described apparatus is provided, the above-described object may be achieved.

In accordance with the present invention, the monitoring apparatus which constructs the ring network judges whether or not relaying of a user frame is permitted by checking whether or not the periodically transmitted health check frame is received. As a consequence, the high-speed switching of the routes can be realized.

DETAILED DESCRIPTION OF THE INVENTION

Referring now to drawings, a detailed description is made of a ring network constructing apparatus according to an embodiment of the present invention.

Figure 1A:
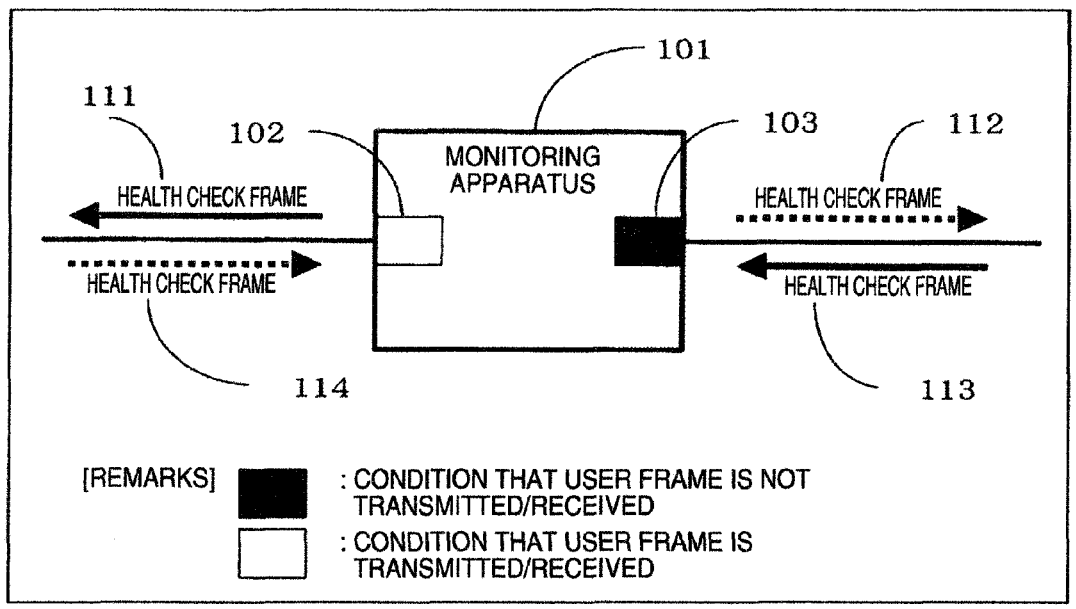
FIG. 1A and FIG. 1B are diagrams for schematically showing a monitoring apparatus employed in a ring network constructing apparatus according to an embodiment of the present invention.
Figure 1B:
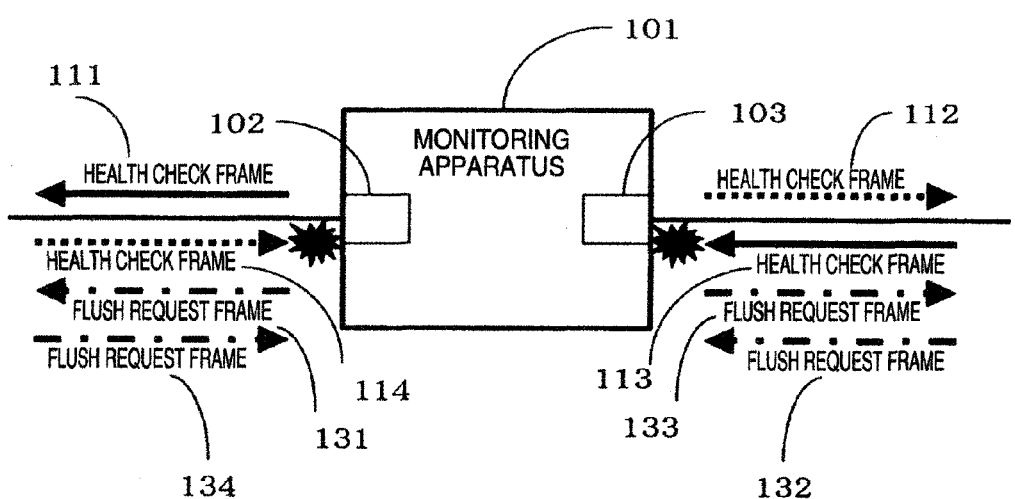
Figure 6:
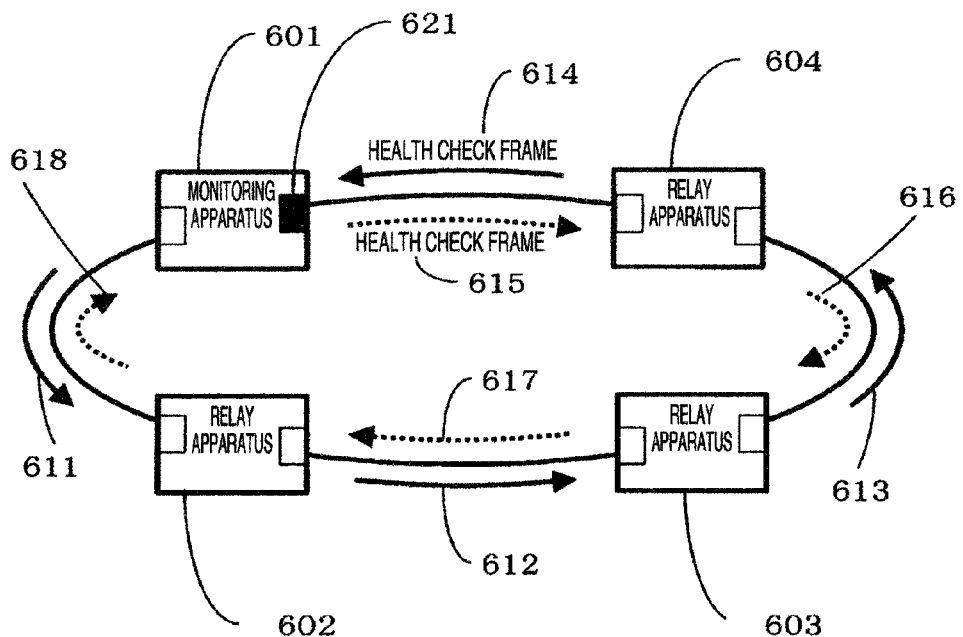
FIG. 6 is a structural diagram of a single ring network with employment of the ring network constructing apparatus of the embodiment.

FIG. 1A and FIG. 1B schematically show an apparatus 101 (will be referred to as "monitoring apparatus" hereinafter) which monitors a ring network employed in a ring network constructing apparatus according to an embodiment of the present invention. The monitoring apparatus 101 constitutes a portion of a ring network indicated, for example, in FIG. 6, and corresponds to an apparatus 601 which monitors this ring network. The ring network is arranged by the monitoring apparatus 601 and other relay apparatuses 602, 603, and 604. Although a detailed description as to FIG. 6 will be made later, in this example, for instance, operations of the monitoring apparatus 601 in the ring network of FIG. 6 are described with reference to FIG. 1A and FIG. 1B. The monitoring apparatus 101 contains two pieces of ports (will be referred to as "ring ports" hereinafter) 102 and 103, which constitute the same ring network. The monitoring apparatus 101 periodically transmits a control frame 111 from the ring port 102 so as to monitor whether or not a health check frame 113 via other apparatuses which constitute the ring network has been received at the ring port 103. The control frame 111 (will be referred to as "health check frame" hereinafter) monitors such a status (will be referred to as "ring status" hereinafter) as to whether or not the ring network has performed a communicating operation under normal condition, and after the health check frame 113 has been received, this health check frame 113 is discarded. Similarly, the monitoring apparatus 101 periodically transmits a health check frame 112 from the ring port 103 so as to monitor whether or not this health check frame 114 has been received at the ring port 102, and after this health check frame 114 has been received, the received health check frame 114 is discarded. While any one of the health check frame 113 and the health check frame 114 is being received, the monitoring apparatus 101 judges that the ring status is under normal condition, and brings the ring port 103 into such a condition that a user frame is not transmitted/received in order not generate a loop (FIG. 1A). When both the health check frames 113 and 114 cannot be received, the monitoring apparatus 101 judges that the ring status is under abnormal condition, and transfers the ring port 103 to such a condition that the user frame is transmitted/received (FIG. 1B). In this example, the ring port 103 controls whether or not the transmission/reception of the user frame are permitted in response to the ring status. Alternatively, the ring port 102 may control whether or not the transmission/reception of the user frame are permitted in response to the ring status. A ring port for controlling whether or not the transmission/reception of the user frame are permitted may be automatically determined based upon the numbers of the two ring ports, or may be alternatively designated based upon a configuration by a user.

It should also be noted that in the monitoring apparatus 101, the health check frames 111 and 112 are periodically transmitted from the two ring ports 102 and 103, and the reception of the health check frames 111 and 112 are monitored at the ring ports which are different from those used in the frame transmissions. Alternatively, the health check frames 111 and 112 may be periodically transmitted only from any one of the ring ports 102 and 103, and the received health check frames 111 and 112 may be monitored only at the other ring port thereof. Also, at this time, while the health check frames 111 and 112 can be received at the other ring port, the monitoring apparatus 101 may judge that the ring status is under normal condition, and defines this ring status as such a status (which is painted in solid condition in drawings) that a user frame is not transmitted/received at any one of these two ring ports 102 and 103. Also, another status that the user frame is transmitted/received at the other ring port thereof is indicated in a blank condition. When the health check frames 112 and 113 cannot be received at the other ring port, the monitoring apparatus 101 judges that the ring status is under abnormal condition, and changes such a ring port from which the transmissions/reception of the user frame are not permitted into a condition under which the user frame is transmitted/received. Thereafter, the monitoring apparatus 102 clears MAC address information and transmits flush request frames from the two ring ports 102 and 103, and when this flush request frame is received at the opposite ring port, the received flush request frame may be discarded.

Further, in the case that in the monitoring apparatus 101, the ring status is changed (ring status is changed from normal condition to abnormal condition, or from abnormal condition to normal condition) by permitting, or not permitting the receptions of the health frames 113 and 114, the monitoring apparatus 101 transmits a control frame 131 (will be referred to as "flush request frame" hereinafter) from the ring port 102 with respect to other apparatus (will be referred to as "relay apparatus" hereinafter) which constitutes the ring network, and when a flush request frame 132 is received at the ring port 103, the monitoring apparatus 101 discards the received flush request frame 132. The above-described control frame 131 instructs to clear MAC address information which has been studded by receiving a user frame with respect to the relay apparatus. Similarly, in such a case that the monitoring apparatus 101 transmits a flush request frame 133 from the ring port 103 and receives a flush request frame 134 at the ring port 102, the monitoring apparatus 101 discards the received flush request frame 134. In the monitoring apparatus 101, when the ring status is changed, this monitoring apparatus 101 also clears the MAC address information which has been learned by receiving the user frame. Generally speaking, MAC address information which has been learned by receiving a user frame implies, for example, such MAC address information that port numbers for transferring combinations between MAC address and VLAN information to a key have been held as a table.

Figure 2A:
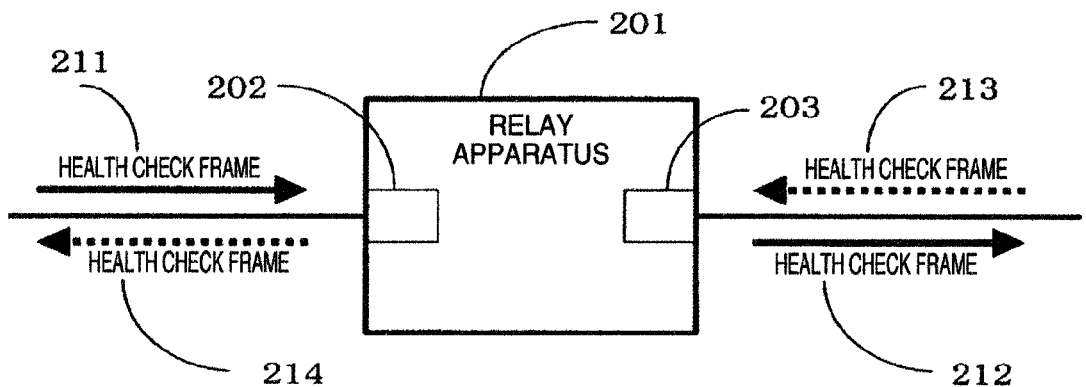
FIG. 2A and FIG. 2B are diagrams for indicating a relay apparatus employed in the ring network constructing apparatus of the embodiment.
Figure 2B:
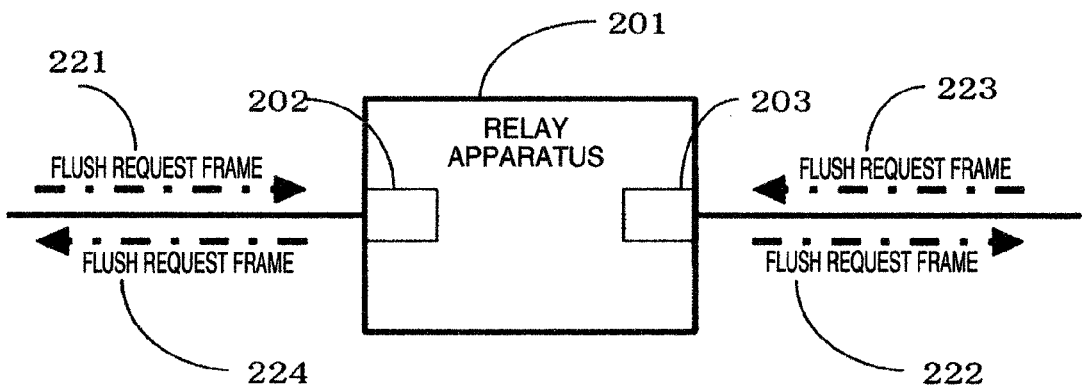

FIG. 2A and FIG. 2B show another relay apparatus 201 which constitutes the ring network. The relay apparatus 201 corresponds to, for example, relay apparatuses 602, 603, and 604 other than a monitoring apparatus 601, which constitute a ring network shown in FIG. 6. The relay apparatus 201 contains two ring ports 202 and 203, which constitute the same ring network. When a health check frame 211 transmitted from a monitoring apparatus is received at the ring port 202, the relay apparatus 201 relays a health check frame 212 to the ring port 203. Similarly, when a health check frame 213 is received at the ring port 203, the relay apparatus 201 relays a health check frame 214 to the ring port 202 provided on the opposite side (FIG. 2A). In the relay apparatus 201, only health check frames are relayed, but are not monitored.

Also, for example, in such a case that due to a failure of the ring network, a ring port to which a received health check frame is transferred is brought into a link down condition, the health check frame cannot be transferred to a succeeding apparatus from a relay apparatus brought into the link down condition. As a result, the health check frame is not transferred up to a monitoring apparatus. In this case, the monitoring apparatus judges that the ring status is under abnormal condition. However, if the network failure is recovered and the link down condition is changed into a link up condition, then a health check frame can be again transferred. As a result, the monitoring apparatus judges that the ring status becomes a normal condition.

When a flush request frame 221 transmitted from a monitoring apparatus is received at the ring port 202 in the relay apparatus 201, the relay apparatus 201 relays a flush request frame 222 to the ring port 203, and at the same time, clears MAC address information which has been learned by receiving a user frame. Similarly, when a flush request frame 223 transmitted from a monitoring apparatus is received at the ring port 203 in the relay apparatus 201, the relay apparatus 201 relays a flush request frame 224 to the ring port 202 provided on the opposite side, and at the same time, clears the MAC address information which has been learned by receiving the user frame (FIG. 2B). It should also be noted that when the relay apparatus 201 has already cleared the MAC address information by receiving the previous flush request frame 221, the relay apparatus 201 does not clear the MAC address information by receiving the flush request frame 223.

When either the ring port 202 or the ring port 203 has been brought into the link down condition, the condition of the relay apparatus 201 is brought into such a condition that a control frame and a user frame are not relayed. However, when this link down condition is recovered to a link up condition, the condition of the relay apparatus 201 is changed into such a condition that the control frame is relayed, and the user frame is not relayed. This reason is given as follows: That is, when the condition of the relay apparatus 201 is brought into such a condition that the relay apparatus 201 relays the user frame just after the link down condition is recovered to the link up condition, if the monitoring apparatus has still set to such a condition that one of the ring ports 202 and 203 is used to transmit/receive the user frame, then a loop may occur. Then, under this condition, when the relay apparatus 201 receives any one of the flush request frames 221 and 223 transmitted from the monitoring apparatus, the condition of the relay apparatus 201 is changed into such a condition that the user frame is relayed. Otherwise, even when a flush request frame has not yet been received, after a predetermined time has passed, the condition of the relay apparatus 201 is changed into the condition that the user frame is relayed.

Figure 10:
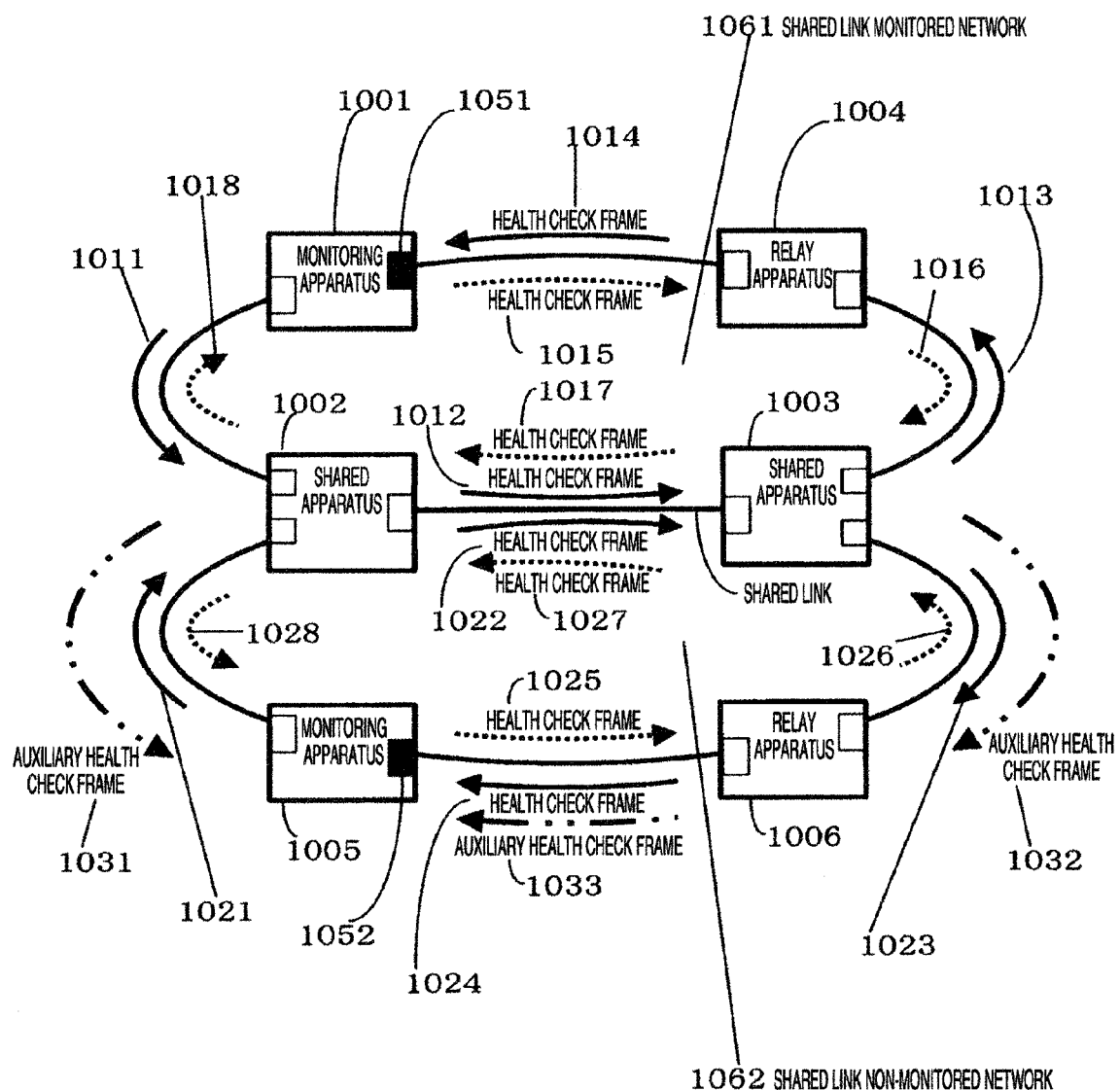
FIG. 10 is a structural diagram of a multi-ring network (having shared link) with employment of the ring network constructing apparatus of the embodiment.

Next, a description is made of a network structure in which a plurality of ring networks have been coupled to each other, which will be referred to as a multi-ring network hereinafter. The multi-ring network has been arranged in such a manner that, for instance, as represented in FIG. 10, two sets of ring networks 1061 and 1062 have been coupled to each other by employing shared apparatuses 1002 and 1003. In this case, 2 sets, or more sets of ring networks to be coupled to each other may be alternatively employed, and 2 pieces, or more pieces of shared apparatuses may be alternatively employed. In the two ring networks 1061 and 1062, monitoring apparatuses 1001 and 1005 are present respectively. While control frames which are transmitted by the monitoring apparatuses 1001 and 1005 are transferred only within the respective ring networks 1061 and 1062, both the control frames of the monitoring apparatuses 1001 and 1005 are transferred between the shared apparatus 1002 and the shared apparatus 1003 (will be referred to as "shared link" hereinafter). In the present embodiment, while the monitoring apparatuses 1001 and 1005 monitor ring status of the respective ring networks 1061 and 1062, as to the shared link, only the monitoring apparatus 1001 monitors, whereas the monitoring apparatus 1005 monitors ring status of the ring network other than the shared link within the ring network 1062. As a consequence, these ring networks are divided into a ring network (will be referred to as "shared link monitored ring network" hereinafter) 1061 which monitors the ring status containing also the shared link, and another ring network (will be referred to as "shared link non-monitored ring network" hereinafter) 1062 which monitors the ring status which do not contain the shared link. At this time, the shared link monitored ring network 1061 and the shared link non-monitored ring network 1062 correspond to independent ring networks respectively. It should also be noted that a detailed description as to FIG. 10 will be discussed later.

Next, a description is made of operations of the respective apparatuses which constitute the multi-ring network. Since the shared link monitored ring network 1061 is identical to such a ring network shown in FIG. 6, the monitoring apparatus 1001 performs the same operation as that of the monitoring apparatus 101 described in FIG. 1A and FIG. 1B, whereas the shared apparatuses 1002 and 1003, and the relay apparatus 1004 perform the same operations as those of the relay apparatus 201 explained in FIG. 2A and FIG. 2B. As a result, the shared link monitored ring network 1061 is monitored.

Next, a description is made of operations of the respective apparatuses employed in the shared link non-monitored ring network 1062.

Figure 3A:
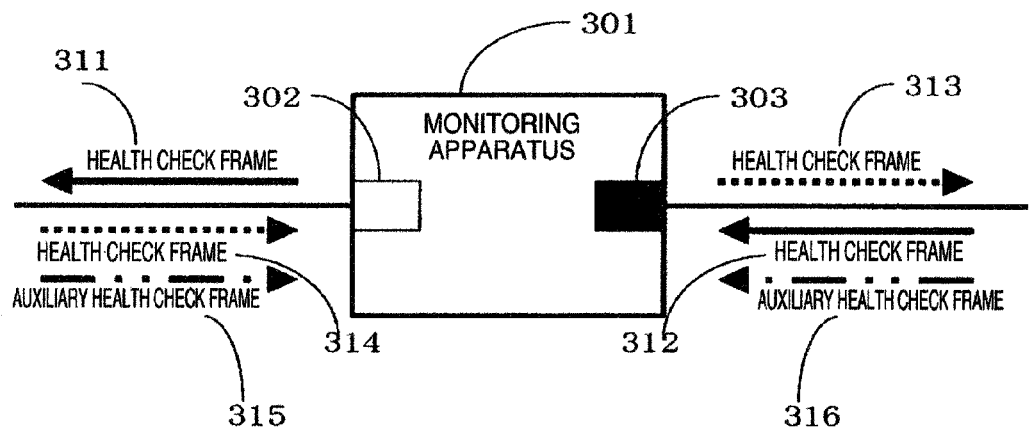
FIG. 3A and FIG. 3B are diagrams for representing a monitoring apparatus in a shared link non-monitored ring network of the ring network constructing apparatus of the embodiment.
Figure 3B:
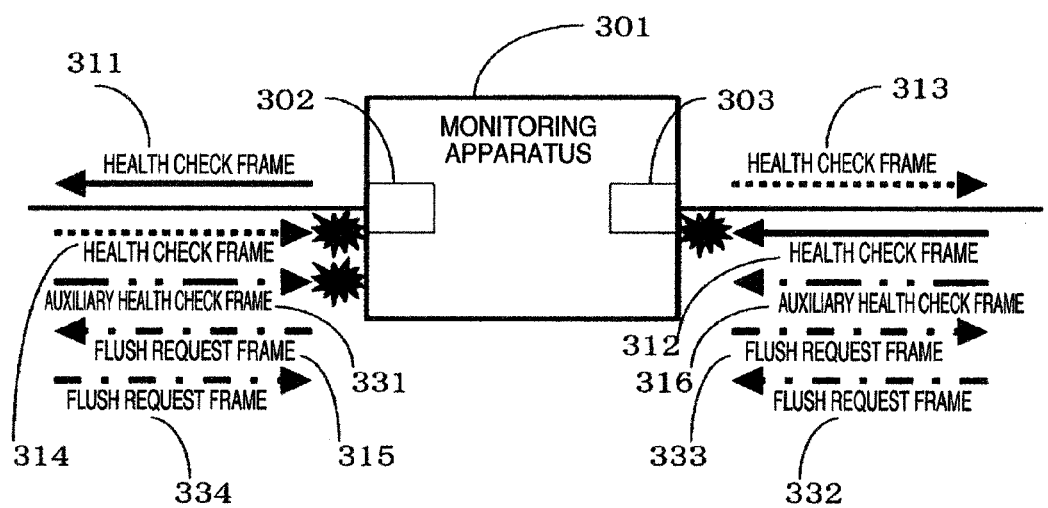

FIG. 3A and FIG. 3B indicate a monitoring apparatus 301 provided in the shared link non-monitored ring network 1062. The monitoring apparatus 301 contains two pieces of ring ports 302 and 303, which constitute the same ring network. The monitoring apparatus 301 periodically transmits a control frame 311 (will be referred to as "health check frame" hereinafter) for monitoring a ring status from the ring port 302 via a relay apparatus so as to monitor whether or not a health check frame 312 has been received at the ring port 302, and after the health check frame 312 has been received, this health check frame 312 is discarded. Similarly, the monitoring apparatus 301 periodically transmits a health check frame 313 from the ring port 303 so as to monitor whether or not this health check frame 314 has been received at the ring port 302, and after this health check frame 314 has been received, the received health check frame 314 is discarded. Also, in combination with this operation, the monitoring apparatus 301 monitors both an auxiliary health check frame (will be referred to as "auxiliary health check frame" hereinafter) 315, and another auxiliary health check frame 316, and after these auxiliary health check frames 315 and 316 have been received, these received auxiliary health check frames 315 and 316 are discarded. The auxiliary health check frames 315 and 316 are periodically transmitted from a shared apparatus 401 which will be discussed later in FIG. 4A and FIG. 4B with respect to the ring port 302 and to the ring port 303 respectively. While any one of the health check frame 312 and the health check frame 314 is being received, the monitoring apparatus 301 judges that the ring status is under normal condition, and sets the ring port 302 into such a condition that a user frame is not transmitted/received (FIG. 3A). Although both the health check frames 312 and 314 cannot be received, while both the auxiliary health check frames 315 and 316 are being received, the monitoring apparatus 301 judges that the ring status is under normal condition, and sets the ring port 303 to such a condition 321 that the user frame is not transmitted/received, since it is conceivable that the apparatuses other than the shared link which should be monitored are under normal conditions. When both the health check frames 312 and 314 cannot be received, but also, any one of the auxiliary health check frames 315 and 316 cannot be received, the monitoring apparatus 301 judges that the ring status is under abnormal condition, and thus, transfers the ring port 303 to such a condition 322 that the user frame is transmitted/received (FIG. 3B). In this case, although the ring port 303 controls whether or not the transmission/reception of the user frame are permitted in response to the ring status, the ring port 302 may control whether or not the transmission/reception of the user frame are permitted in response to the ring status. A ring port for controlling whether or not the transmission/reception of the user frame are permitted may be automatically determined based upon the numbers of the two ring ports, or may be alternatively designated based upon a configuration by a user.

Further, in the case that in the monitoring apparatus 301, the ring status is changed (ring status is changed from normal condition to abnormal condition, or from abnormal condition to normal condition) by permitting, or not permitting the receptions of the health frames 312 and 314, the monitoring apparatus 301 transmits a control frame (will be referred to as "flush request frame" hereinafter) 331 from the ring port 302 with respect to other apparatuses which constitute the ring network, and when a flush request frame 332 is received at the ring port 303, the monitoring apparatus 301 discards the received flush request frame 332. The above-described control frame 331 instructs to clear MAC address information which has been learned by receiving a user frame with respect to other apparatuses. Similarly, in such a case that the monitoring apparatus 301 transmits a flush request frame 333 from the ring port 303 and receives a flush request frame 334 at the ring port 302, the monitoring apparatus 301 discards the received flush request frame 334. In the monitoring apparatus 301, this monitoring apparatus 301 also clears the MAC address information which has been learned by receiving the user frame.

Figure 4A:
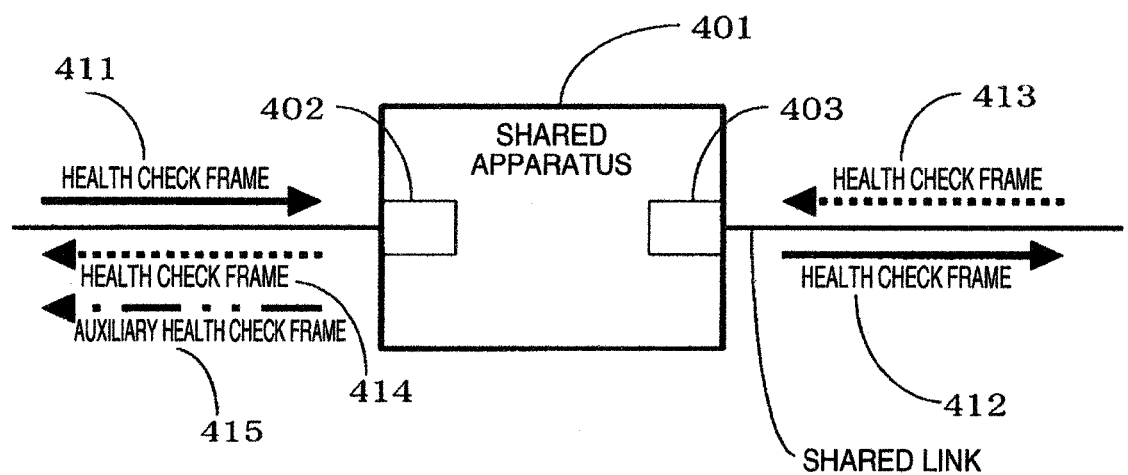
FIG. 4A and FIG. 4B are diagrams for showing a relay apparatus (which is commonly operable as shared apparatus) in the shared link non-monitored ring network of the ring network constructing apparatus of the embodiment.
Figure 4B:
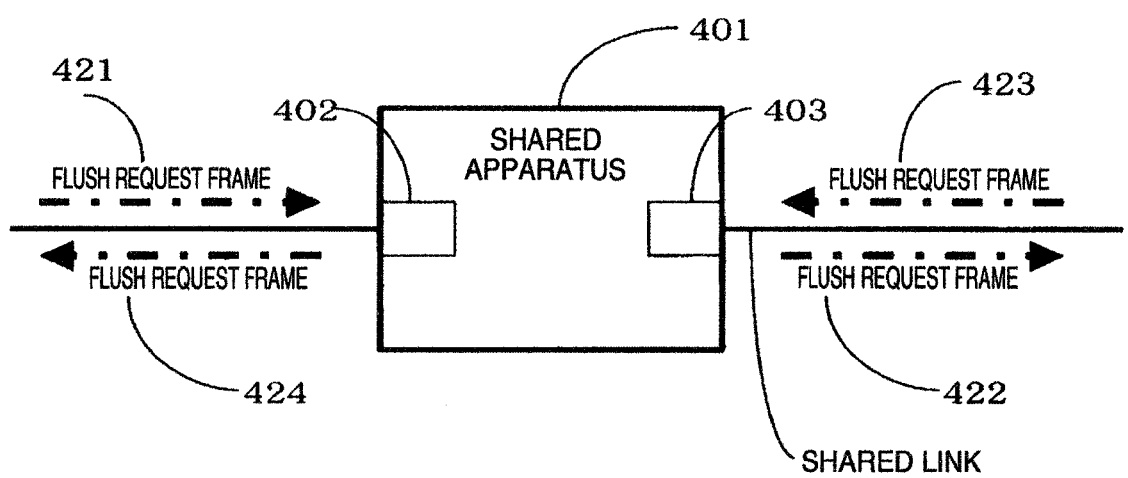

FIG. 4A and FIG. 4B show a shared apparatus 401 employed in the shared link non-monitored ring network 1062. The shared apparatus 401 has two ring ports 402 and 403, which constitute the same ring network. The ring port 403 corresponds to a port which is used as a shared link with another ring network. The shared apparatus 401 periodically transmits an auxiliary health check frame 415 from the ring port 402 toward the monitoring apparatus 301 of the ring network, which does not monitor the shared link. Also, since the shared apparatus 401 also constitutes the relay apparatus, when a health check frame 411 transmitted from the monitoring apparatus 301 is received at the ring port 402, the shared apparatus 401 relays a health check frame 412 to the ring port 403. Also, similarly, when a health check frame 413 is received at the ring port 403, the shared apparatus 401 relays a health check frame 414 to the ring port 402 provided on the opposite side (FIG. 4A).

It should also be noted that such a fact whether or not a health check frame transmitted from the monitoring apparatus 301 of the shared link non-monitored ring network 1062 has been received may be alternatively superimposed on the auxiliary health check frame 415 which is transmitted from the shared apparatus 401. Also, while the shared apparatus 401 does not periodically transmit the auxiliary health check frame 415 which is transmitted from the shared apparatus 401, the shared apparatus 401 may alternatively transfer such a health check frame transmitted from the monitoring apparatus 301 to the next apparatus, and also may fold back this transferred health check frame, and then, may alternatively transmit the folded health check frame to the monitoring apparatus 301 as the auxiliary health check frame 415.

Also, when the shared apparatus 401 receives a flush request frame 421 at the ring port 402, which is transmitted from the monitoring apparatus 301, the shared apparatus 401 relays a flush request frame 422 to the ring port 403, and at the same time, clears MAC address information which has been learned by receiving a user frame. Similarly, when the shared apparatus 401 receives a flush request frame 423 at the ring port 403, the shared apparatus 401 relays a flush request frame 424 to the ring port 402 provided on the opposite side, and at the same time, clears the MAC address information. It should be noted that when the shared apparatus 401 has already cleared the MAC address information by receiving the previous flush request frame 421, the shared apparatus 401 does not clear the MAC address information by receiving the flush request frame 423.

When either the ring port 402 or the ring port 403 has been brought into the link down condition, the condition of the shared apparatus 401 is brought into such a condition that a control frame and a user frame are not relayed. However, when this link down condition is recovered to a link up condition, the condition of the shared apparatus 401 is changed into such a condition that the control frame is relayed, and the user frame is not relayed. This reason is given as follows: That is, when the condition of the shared apparatus 401 is brought into such a condition that the shared apparatus 401 relays the user frame just after the link down condition is recovered to the link up condition, if the monitoring apparatus has still set to such a condition that one of the ring ports 402 and 403 is used to transmit/receive the user frame, then a loop may occur. Then, under this condition, when the shared apparatus 401 receives any one of the flush request frames 421 and 423 transmitted from the monitoring apparatus, the condition of the shared apparatus 401 is changed into such a condition that the user frame is relayed. Otherwise, even when a flush request frame has not yet been received, after a predetermined time has passed, the condition of the shared apparatus 401 is changed into the condition that the user frame is relayed.

Figure 5A:
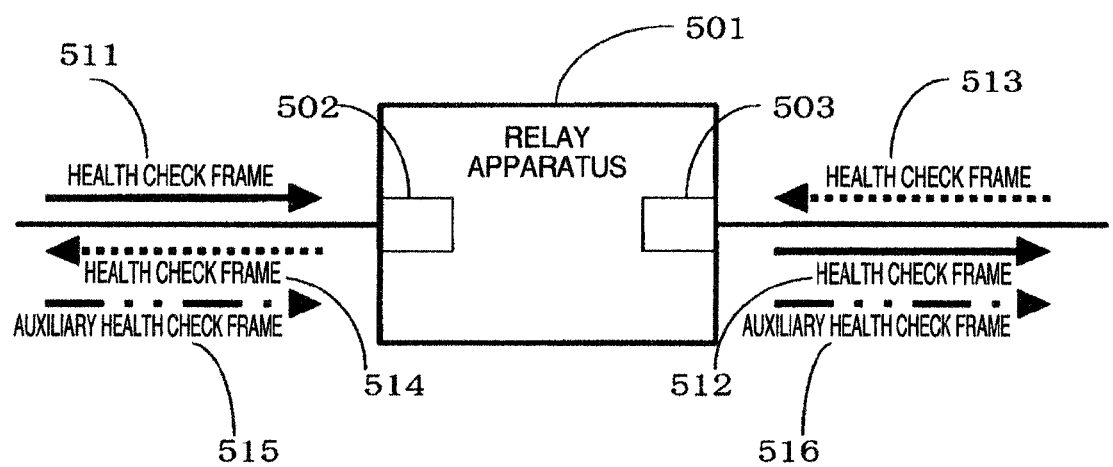
FIG. 5A and FIG. 5B are diagrams for showing a relay apparatus in the shared link non-monitored ring network of the ring network constructing apparatus of the embodiment.
Figure 5B:
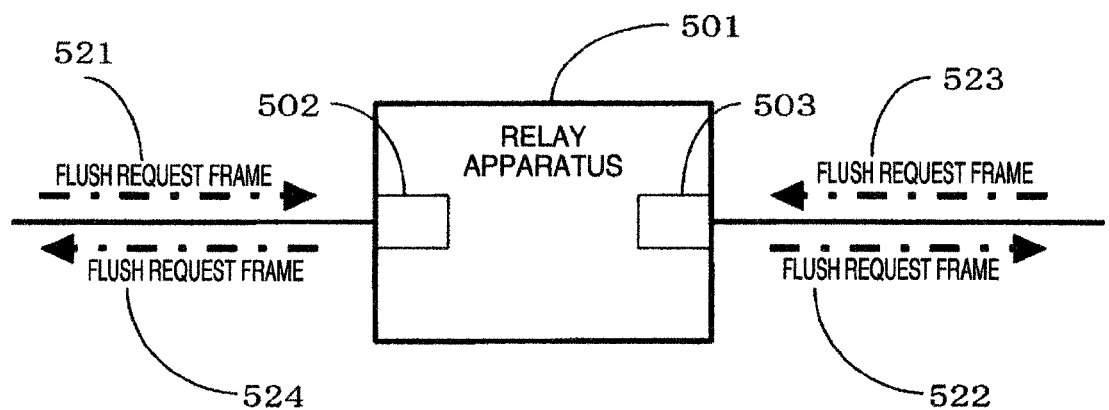

FIG. 5A and FIG. 5B indicate a relay apparatus 501 provided in the shared link non-monitored ring network 1062. The relay apparatus 501 contains two ring ports 502 and 503, which constitute the same ring network. When the relay apparatus 501 receives either a health check frame 511 transmitted from a monitoring apparatus or an auxiliary health check frame 515 transmitted from a shared apparatus, the relay apparatus 501 relays either a health check frame 512 or a health check frame 516 to the ring port 503. Similarly, when the relay apparatus 501 receives the health check frame 513 at the ring port 503, the relay apparatus 501 relays a health check frame 514 to the ring port 202 located opposite side thereof (FIG. 5A).

Also, when the relay apparatus 501 receives a flush request frame 521 at the ring port 502, which is transmitted from the monitoring apparatus 501, the relay apparatus 501 relays a flush request frame 522 to the ring port 503, and at the same time, clears MAC address information which has been learned by receiving a user frame. Similarly, when the relay apparatus 501 receives a flush request frame 523 at the ring port 503, the relay apparatus 501 relays a flush request frame 524 to the ring port 502 provided on the opposite side, and at the same time, clears the MAC address information. It should be noted that when the relay apparatus 501 has already cleared the MAC address information by receiving the previous flush request frame 521, the relay apparatus 501 does not clear the MAC address information by receiving the flush request frame 523.

When either the ring port 502 or the ring port 503 has been brought into the link down condition, the condition of the relay apparatus 501 is brought into such a condition that a control frame and a user frame are not relayed. However, when this link down condition is recovered to a link up condition, the condition of the relay apparatus 501 is changed into such a condition that the control frame is relayed, and the user frame is not relayed. This reason is given as follows: That is, when the relay apparatus 501 is brought into such a condition that the relay apparatus 501 relays the user frame just after the link down condition is recovered to the link up condition, if the monitoring apparatus has still set to such a condition that one of the ring ports 502 and 503 is used to transmit/receive the user frame, then a loop may occur. Then, under this condition, when the relay apparatus 501 receives any one of the flush request frames 521 and 523 transmitted from the monitoring apparatus, the condition of the relay apparatus 501 is changed into such a condition that the user frame is relayed. Otherwise, even when a flush request frame has not yet been received, after a predetermined time has passed, the condition of the relay apparatus 501 is changed into the condition that the user frame is relayed.

In the relay apparatus 501 and the shared apparatus 401, when a link condition of a ring port is changed, a control frame (will be referred to as "link condition change notification frame" hereinafter) may be alternatively transmitted from a ring port under normal condition, while this control frame notifies the change in the link condition. Also, the monitoring apparatus 301 may not only monitor the ring status based upon either the health check frame or the auxiliary health check frame, but also may monitor the ring status, while including the reception of the link condition change notification frame which is transmitted from either the relay apparatus 501 or the shred apparatus 401 in addition to these health check frames. It is so assumed that the transmission time periods as to the health check frames and the auxiliary health check frames, and the time durations required for judging that the ring status are under the abnormal conditions since the health check frames are not yet received may be changed based upon a configuration by a user. These transmission time periods and time durations have been described in the monitoring apparatuses 101 and 301 shown in FIG. 1A, FIG. 1B, FIG. 3A, FIG. 3B; and also in the shared apparatus 401 shown in FIG. 4A, FIG. 4B.

While the monitoring apparatuses 101 and 301 explained in FIG. 1A, FIG. 1B, FIG. 3A, and FIG. 3B are equipped with hardware circuits, these hardware circuits transmit/receive various sorts of control frames and user frames from ring ports, and also, monitor whether or not either a health check frame or an auxiliary health check frame is received within a predetermined time at a ring port. In such a case that either the health check frame or the auxiliary health check frame has not yet been received for the predetermined time, the monitoring apparatuses 101 and 301 judge that a ring status is brought into an abnormal condition. Also, while the monitoring apparatuses 101 and 301 monitor the receptions of the health check frame and the auxiliary health check frame under such a condition that the ring status is under abnormal condition, the monitoring apparatus 101 and 301 judge that the ring status is under normal condition by receiving these health check frames. It should also be noted that the above-described functions may be alternatively realized by employing software.

While the relay apparatuses 201 and 501 shown in FIG. 2A, FIG. 2B, FIG. 5A, and FIG. 5B, and also, the shared apparatus 401 shown in FIG. 4A and FIG. 4B are equipped with hardware circuits, these hardware circuits transmit/receive various sorts of control frames and user frames, and also, judge that the ring status is changed.

It should also be noted that the above-described functions may be alternatively realized by employing software.

Based upon FIG. 6, a description is made of operations as to respective apparatuses employed in a single ring network (will be referred to as "single ring network" hereinafter). In FIG. 6, among apparatuses 601 to 604, according to an embodiment of the present invention, which constitute the single ring network, a monitoring apparatus is defined as 601, and relay apparatuses are defined as 602 to 604. Although the single ring network is constituted by employing 4 sets of the apparatuses 601 to 604, there is no limitation as to a total number of these apparatuses.

The monitoring apparatus 601 periodically transmits health check frames 611 and 615 from two ring ports thereof. These health check frames 611 and 615 are relayed in the relay apparatuses 602 to 604, and then, the health check frames 611 and 615 are received at ring ports which are different from the above-described ring ports for transmitting these health check frames 611 and 615. In the case that the health check frame 611, or 615 is being received at any one of these two ring ports, the monitoring apparatus 601 judges that a ring status is under normal condition, and sets such a condition that a user frame is not transmitted/received at a ring port 621 thereof.

Figure 7:
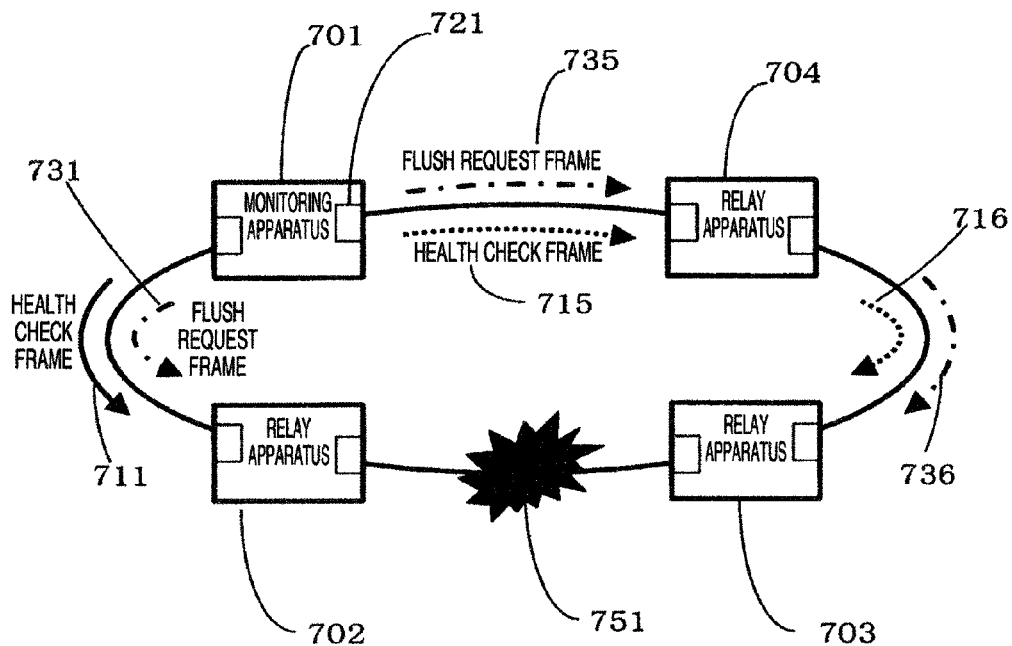
FIG. 7 is another structural diagram of the single ring network with employment of the ring network constructing apparatus of the embodiment.

FIG. 7 indicates a condition that a failure 751 occurs in the single ring network of FIG. 6. When the failure 751 happens to occur, a health check frame 711 transmitted from a monitoring apparatus 701 cannot be relayed from a relay apparatus 702 to a succeeding apparatus. Similarly, a health check frame 715 cannot be also relayed from a relay apparatus 703 to a succeeding apparatus. As a result, the monitoring apparatus 701 cannot receive the health check frames 711 and 715 at the two ring ports thereof, so that the monitoring apparatus 701 judges that a ring status is under abnormal condition, and changes a ring port 721 thereof into such a condition that a user frame can be transmitted/received. Also, the monitoring apparatus 701 clears MAC address information which has been learned by receiving the user frame, and transmits flush request frames 731 and 735 from the two ring ports thereof with respect to other relay apparatuses 702 to 704. The relay apparatuses 702 to 704 which receive either the flush request frame 731 or the flush request frame 735 clear the MAC address information which has been learned by receiving the user frame.

When the failure is recovered from the condition where the failure has occurred in FIG. 7 and then the failure condition is returned to the normal condition of FIG. 6, the monitoring apparatus 601 receives any one of the health check frames 611 and 615 which are transmitted by the monitoring apparatus 601 at the ring port. As a result, the monitoring apparatus 601 judges that the ring status becomes the normal condition, and again changes such a ring port where the transmission/reception of the user frame have been permitted into another condition where the user frame is not transmitted/received. Also, the monitoring apparatus 601 clears the MAC address information which has been learned by receiving the user frame, and also, transmits a flush request frame from the two ring ports with respect to other relay apparatuses 602 to 604 in a similar manner when the failure 751 occurs in FIG. 7. The relay apparatuses 602 to 604 which receive this flush request frame clear the MAC address information which has been learned by receiving the user frame.

Also, the ring ports of the relay apparatuses 602 and 603 where a failure of a link has occurred can transmit/receive such a control frame as a health check frame and a flush request frame when the failure is recovered, and are brought into such a condition that a user frame cannot be transmitted/received. When the relay apparatuses 602 and 603 receive the flush request frame, the relay apparatuses 602 and 603 change the ring ports where the transmission/receptions of the user frames cannot be permitted into such a condition that the user frames can be transmitted/received. Otherwise, even when the flush request frame is not received, after a predetermined time has passed, the relay apparatuses 602 and 603 changes the present condition into such a condition that the user frames can be transmitted/received.

Figure 8:
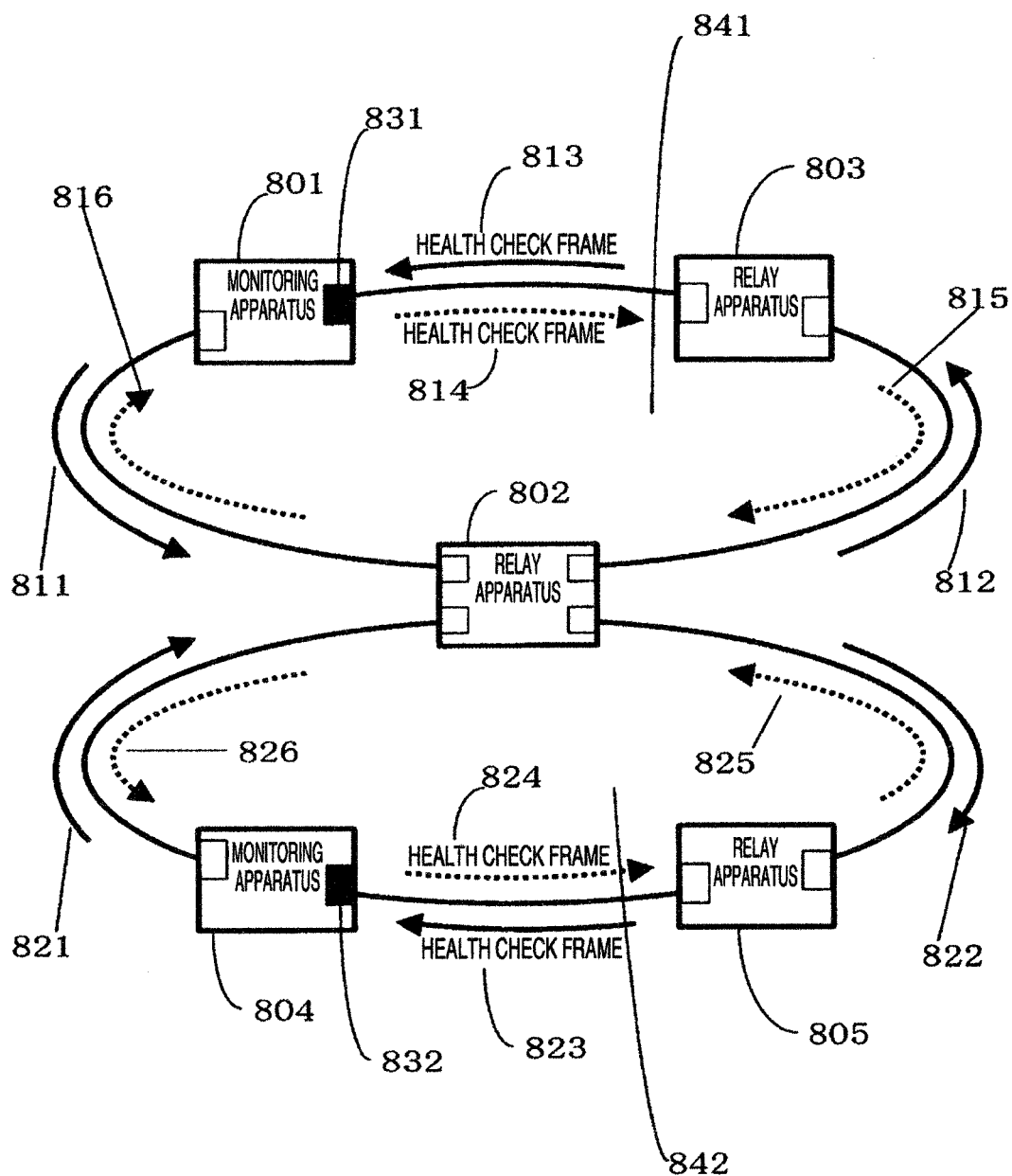
FIG. 8 is a structural diagram of a multi-ring network (having no shared link) with employment of the ring network constructing apparatus of the embodiment.

Referring now to FIG. 8, a description is made of operations as to respective apparatuses provided in such a structure that a plurality of ring networks are coupled to each other, and furthermore, a coupling apparatus has not been made redundant. This structure corresponds to such a network structure that there is no link (namely, shared link) which is shared by the plural ring networks. In FIG. 8, although a total number of the coupled ring networks is selected to be 2, there is no limitation with respect to a total quantity of these ring networks to be coupled to each other.

In FIG. 8, among apparatuses 801 to 803 which constitute a ring network 841, a monitoring apparatus is defined as 801, and relay apparatuses are defined as 802 and 803. Also, among apparatuses 802, 804, and 805, which constitute another ring network 842, a monitoring apparatus is defined as 804, and relay apparatuses are defined as 802 and 805. While the relay apparatus 802 constitutes a coupling apparatus of the ring networks 841 and 842, the relay apparatus 802 has constructed the ring networks 841 and 842 by two different ring ports with respect to each of the ring networks 841 and 842. In this coupling apparatus, control frames which are transmitted/received in the respective ring networks 841 and 842 are relayed by being closed in the respective ring networks 841 and 842, but are not transferred to the other ring network. The monitoring apparatus 801 monitors a ring status of the ring network 841, and sets a ring port 831 thereof to such a condition that a user frame is not transmitted and received. The monitoring apparatus 804 monitors a ring status of the ring network 842, and sets a ring port 832 thereof to such a condition that a user frame is not transmitted and received. As a result, the ring networks 841 and 842 can be independently operated.

Figure 9:
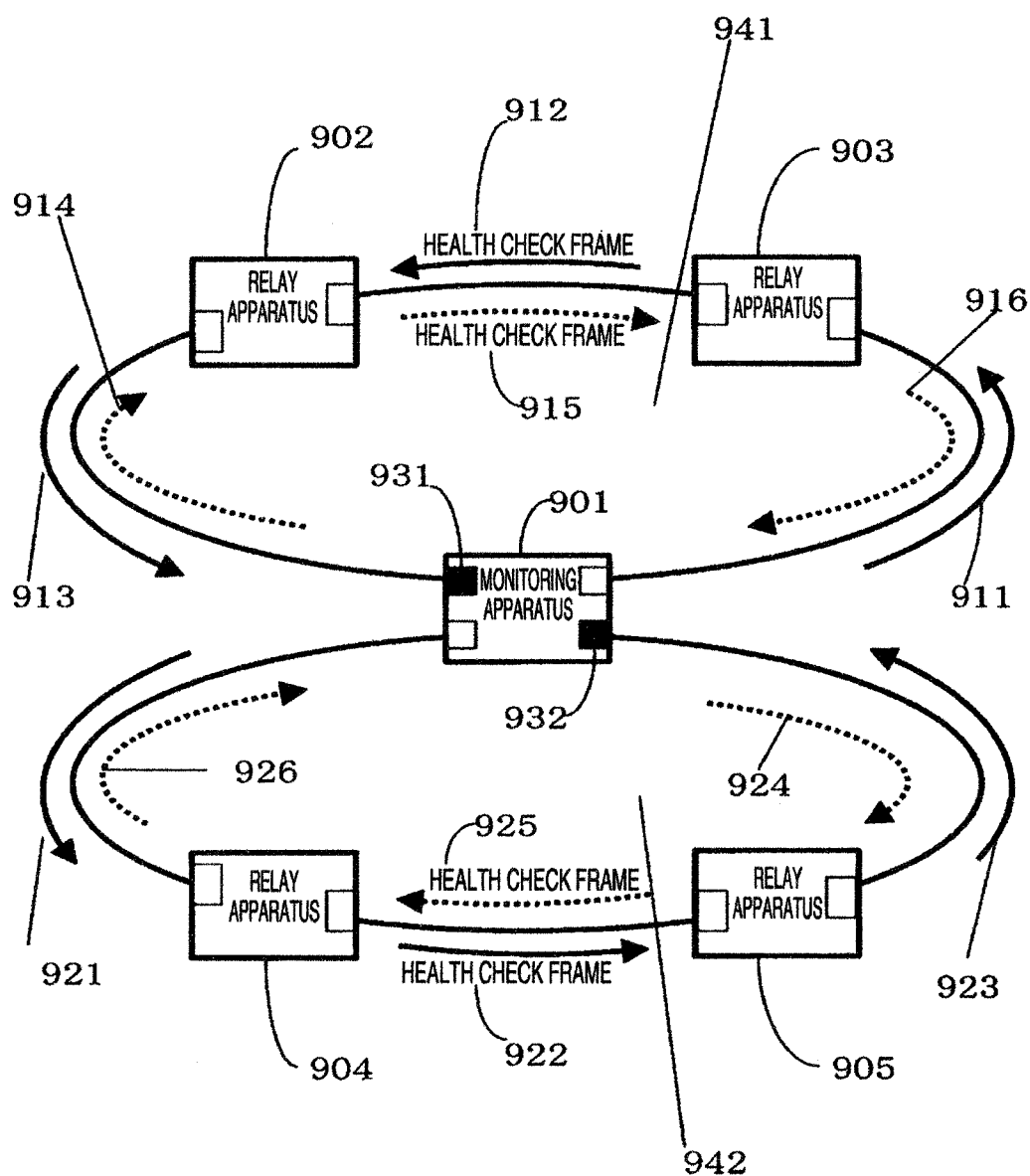
FIG. 9 is another structural diagram of the multi-ring network (having no shared link) with employment of the ring network constructing apparatus of the embodiment.

FIG. 9 indicates a structure made in the case that an apparatus for coupling two ring networks is used as a monitoring apparatus. In FIG. 9, among apparatuses 901 to 903 which constitute a ring network 941, a monitoring apparatus is defined as 901, and relay apparatuses are defined as 902 and 903. Also, among apparatuses 902, 904, and 905, which constitute another ring network 942, a monitoring apparatus is defined as 901, and relay apparatuses are defined as 904 and 905. While the coupled apparatus becomes the monitoring apparatus 901, this coupled apparatus constitutes the ring networks 941 and 942 at two different ring ports with respect to each of the ring networks 941 and 942, and a control frame is not transferred to the other ring network 941, or 942. The monitoring apparatus 901 monitors the ring network 941, and sets a ring port 931 thereof to such a condition that a user frame is not transmitted and received. At the same time, the monitoring apparatus 901 monitors the ring network 942, and sets a ring port 932 thereof to such a condition that a user frame is not transmitted and received. As a result, the ring networks 941 and 942 can be independently operated.

Referring now to FIG. 10, a description is made of operations as to respective apparatuses provided in such a structure that a plurality of ring networks are coupled to each other, and furthermore, a coupling apparatus has been made redundant. In FIG. 10, although a total number of the coupled ring networks is selected to be 2, there is no limitation with respect to a total quantity of these ring networks to be coupled to each other.

In FIG. 10, among apparatuses 1001 to 1004 which constitute a ring network 1061, a monitoring apparatus is defined as 1001, and relay apparatuses are defined as 1002 to 1004. Also, among apparatuses 1002, 1003, 1005, and 1006, which constitute another ring network 1062, a monitoring apparatus is defined as 1005, and relay apparatuses are defined as 1002, 1003, and 1006. While the relay apparatus 1002 and 1003 constitute coupling apparatuses of the ring networks 1061 and 1062, the relay apparatuses 1002 and 1003 have been constructed as having redundant structures (will be referred to as "shared apparatus" hereinafter). Also, a link between the shared apparatuses 1002 and 1003 constitutes such a link (will be referred to as "shared link" hereinafter) which is shared by the ring networks 1061 and 1062. In the shared apparatuses 1062 and 1063, control frames which are transmitted/received in the respective ring networks 1061 and 1062 are relayed by being closed in the respective ring networks 1061 and 1062, but are not transferred to the other ring network. Within the two ring networks, the ring network 1061 is defined as such a ring network (will be referred to as "shared link monitored ring network" hereinafter) which monitors a ring status containing also the shared link, whereas the ring network 1062 is defined as such a ring network (will be referred to as "shared link non-monitored ring network" hereinafter) which monitors a ring status which does not contain the shared link. The monitoring apparatus 1001 of the shared link monitored ring network 1061 periodically transmits health check frames 1011 and 1015 from two ring ports thereof. These health check frames 1011 and 1015 are relayed via the relay apparatuses 1002 to 1004, and the monitoring apparatus 1002 receives the health check frames 1011 and 1015 at different ring ports from the ring ports for transmitting these health check frames 1011 and 1015. Within the two ring ports, while the health check frame is being received at any one of these ring ports, the monitoring apparatus 1002 judges that the ring status is under normal condition, and sets such a condition that a user frame is not transmitted/received at a ring port 1051.

The monitoring apparatus 1005 of the shared link non-monitored ring network 1062 periodically transmits health check frames 1021 and 1025 from two ring ports thereof. Also, since the shared nodes 1002 and 1003 do not monitor the shared link, the shared nodes 1002 and 1003 periodically transmit auxiliary health check frames 1031 and 1032 from such ring ports which are located opposite to the ring ports which become the shred links toward the monitoring apparatus 1005. The auxiliary health check frames 1031 and 1032 are not transmitted to the shared link monitored ring network 1061. These health check frames 1021 and 1025, and these auxiliary health check frames 1031 and 1032 are relayed in the relay apparatuses (including shared apparatus) 1002, 1003, and 1006, and then, the monitoring apparatus 1005 receives these health check frames 1021 and 1025, and these auxiliary health check frames 1031 and 1032 at the two ring ports thereof. Within the two ring ports, while the health check frames 1021 and 1025 are being received at any one of these two ring ports, or while the auxiliary health check frames 1031 and 1032 transmitted from the shared apparatuses 1002 and 1003 are being received at the two ring ports, the monitor apparatus 1005 judges that the ring status is under normal condition, and sets such a condition that the user frame is not transmitted and received at the ring port 1052.

Figure 11:
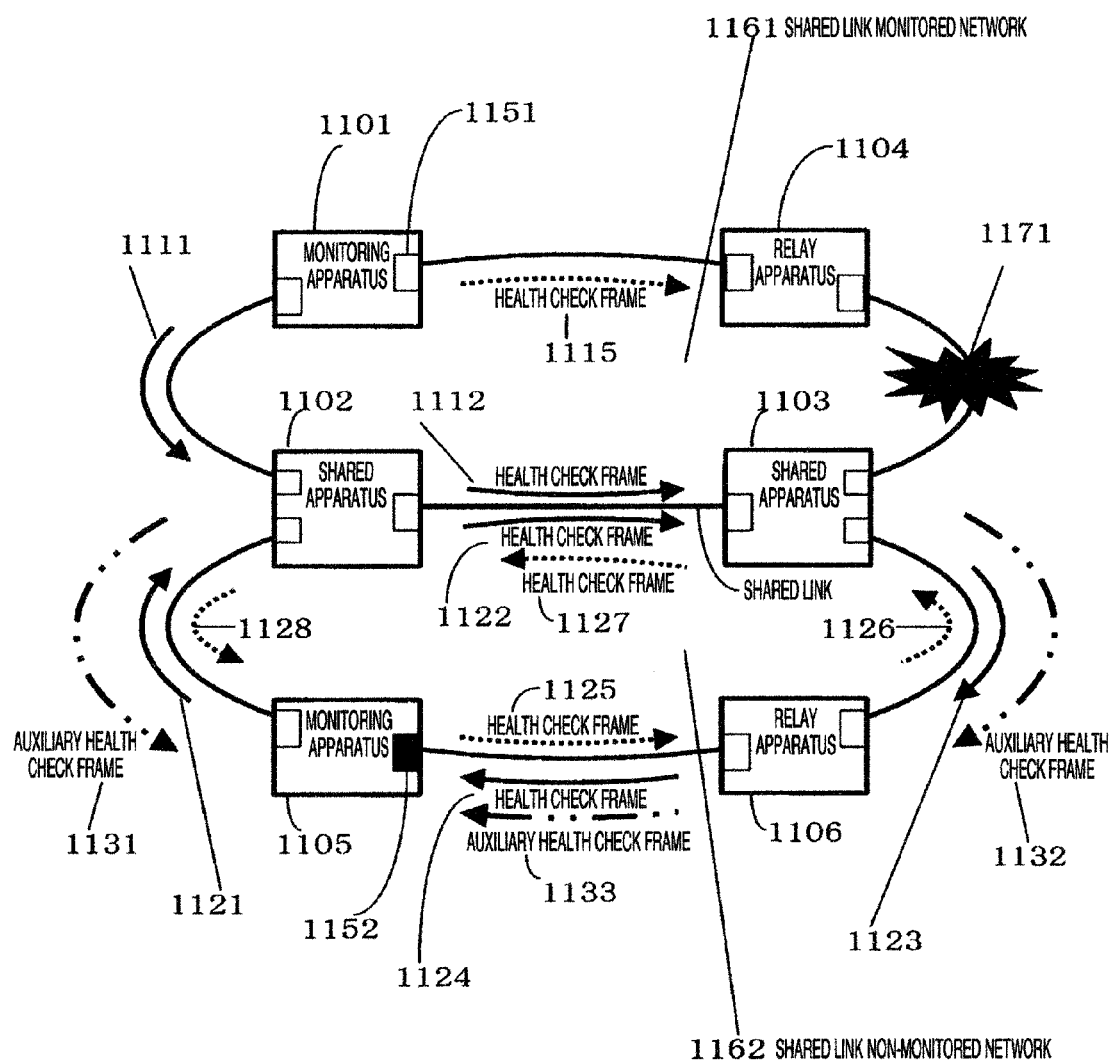
FIG. 11 is another structural diagram of the multi-ring network (having shared link) with employment of the rink network constructing apparatus of the embodiment.

FIG. 11 indicates a condition that a failure 1171 occurs in the shared link monitored ring network 1061 of FIG. 10. When the failure 1171 happens to occur, a health check frame 1111 transmitted from a monitoring apparatus 1101 cannot be relayed from a relay apparatus 1103 to a succeeding apparatus. Similarly, a health check frame 1115 cannot be also relayed from a relay apparatus 1104 to a succeeding apparatus. As a result, the monitoring apparatus 1101 cannot receive the health check frames 1111 and 1115 at the two ring ports thereof, so that the monitoring apparatus 1101 judges that a ring status is under abnormal condition, and changes a ring port 1151 thereof into such a condition that a user frame can be transmitted/received. Also, the monitoring apparatus 1101 clears MAC address information which has been learned by receiving the user frame, and transmits flush request frames 1111 and 1115 from the two ring ports thereof with respect to other relay apparatuses 1102 to 1104. The relay apparatuses 1102 to 1104 which receive the flush request frames 111 and 1115 clear the MAC address information which has been learned by receiving the user frame. At this time, since the monitoring apparatus 1105 of the shared link non-monitored ring network 1162 has already received the health check frames 1111 and 1115 at the two ring ports thereof, this monitoring apparatus 1105 judges that there is no change in the ring status, and is continuously operated.

When the failure is recovered from the condition where the failure has occurred in FIG. 11 and then the failure condition is returned to the normal condition of FIG. 10, the monitoring apparatus 1001 receives any one of the health check frames 1011 and 1015 which are transmitted by the monitoring apparatus 1001 at the ring port. As a result, the monitoring apparatus 1001 judges that the ring status becomes the normal condition, and again changes such a ring port where the transmission/reception of the user frame have been permitted into another condition where the user frame is not transmitted/received. Also, the monitoring apparatus 1001 clears the MAC address information which has been learned by receiving the user frame, and also, transmits a flush request frame from the two ring ports with respect to other relay apparatuses 1002 to 1004 in a similar manner when the failure 751 occurs in FIG. 7. The relay apparatuses 1002 to 1004 which receive this flush request frame clear the MAC address information which has been learned by receiving the user frame. At this time, since the monitoring apparatus 1005 of the shared link non-monitored ring network 1062 has continuously received the health check frames 1124 and 1125, this monitoring apparatus 1005 is continuously operated.

Figure 12:
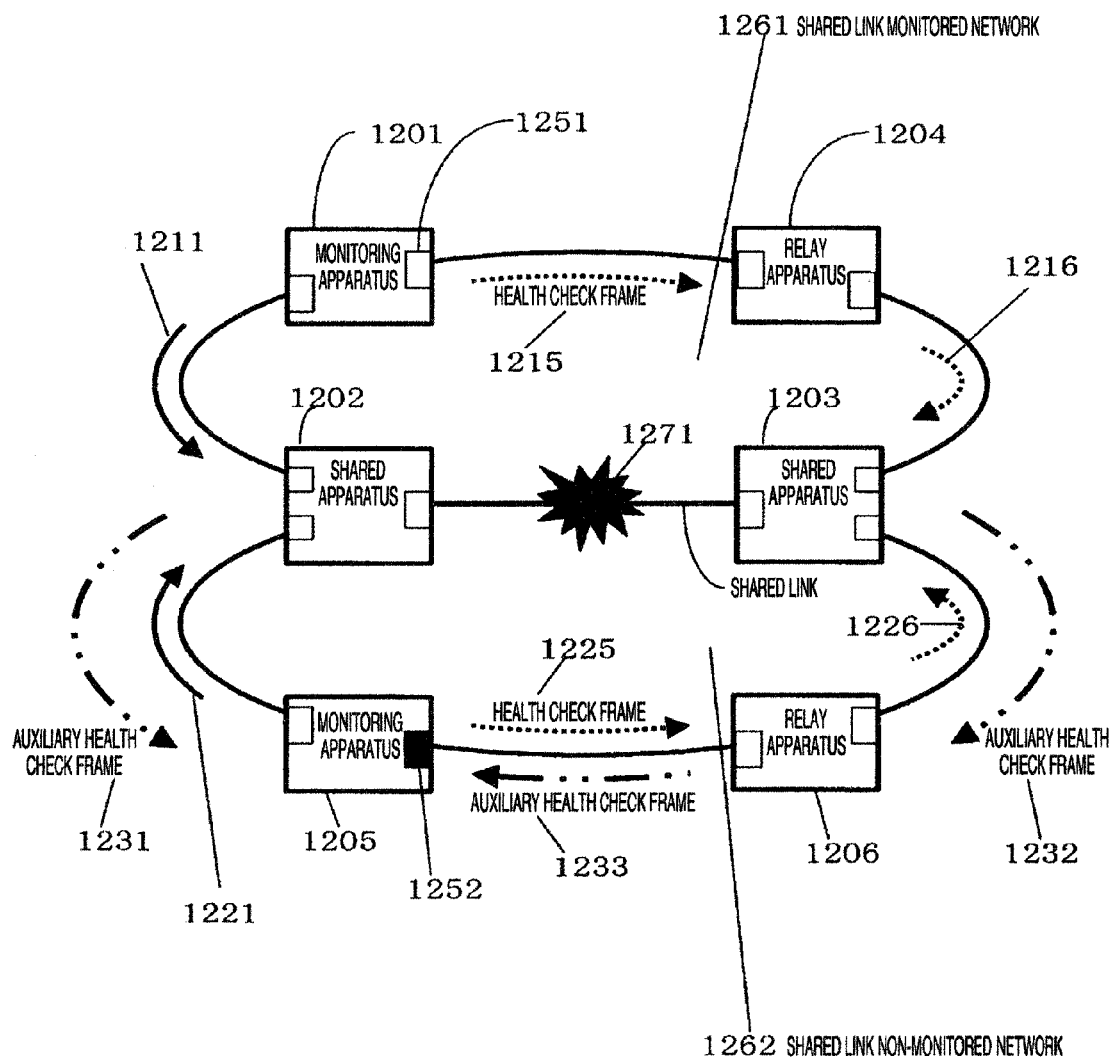
FIG. 12 is a structural diagram of a multi-ring network (having no shared link) with employment of the ring network constructing apparatus of the embodiment.

FIG. 12 represents such a condition that a shared link failure 1271 of FIG. 10 happens to occur. When the shared link failure 1271 occurs, a health check frame 1211 transmitted from a monitoring apparatus 1201 of the shared link monitored network 1261 cannot be relayed from a relay apparatus 1202 to a succeeding apparatus. Similarly, a health check frame 1215 cannot be also relayed from a relay apparatus 1203 to a succeeding apparatus. As a result, the monitoring apparatus 1201 cannot receive the health check frames 1211 and 1215 at the two ring ports thereof, so that the monitoring apparatus 1201 judges that a ring status is under abnormal condition, and changes a ring port 1251 thereof into such a condition that a user frame can be transmitted/received. Also, the monitoring apparatus 1201 clears MAC address information which has been learned by receiving the user frame, and transmits flush request frames 1211 and 1215 from the two ring ports thereof with respect to other relay apparatuses 1202 to 1204. The relay apparatuses 1202 to 1204 which receive the flush request frames 1211 and 1215 clear the MAC address information which has been learned by receiving the user frame. At this time, a health check frame 1221 transmitted from a monitoring apparatus 1205 of a shared link non-monitored network 1262 cannot be relayed from the relay apparatus 1202 to a succeeding apparatus. Similarly, a health check frame 1225 cannot be also relayed from the relay apparatus 1203 to a succeeding apparatus. However, auxiliary health check frames 1231 and 1232 transmitted from the shared apparatuses 1202 and 1203 can be received at the two ring ports of the monitoring apparatus 1205, so that the monitoring apparatus 1205 judges that a ring status except for the shred link is under normal condition, and is continuously operated. In accordance with the above-described operations, even when the failure happens to occur in the shared link, it is possible to avoid an occurrence of a large loop which bridges the plurality of ring networks.

When the failure is recovered from the condition where the failure has occurred in FIG. 12 and then the failure condition is returned to the normal condition of FIG. 10, the monitoring apparatus 1001 of the shared link monitored ring network 1061 receives any one of the health check frames 1011 and 1015 which are transmitted by the monitoring apparatus 1001 at the ring port. As a result, the monitoring apparatus 1001 judges that the ring status becomes the normal condition, and again changes such a ring port where the transmission/reception of the user frame have been permitted into another condition that the user frame is not transmitted/received. Also, the monitoring apparatus 1001 clears the MAC address information which has been learned by receiving the user frame, and also, transmits a flush request frame from the two ring ports with respect to other relay apparatuses 1002 to 1004 in a similar manner when the failure 1271 occurs in FIG. 12. The relay apparatuses 1002 to 1004 which receive this flush request frame clear the MAC address information which has been learned by receiving the user frame.

At this time, the monitoring apparatus 1005 of the shared link non-monitored ring network 1062 also receives the health check frames 1021 and 1025 transmitted from the monitoring apparatus 1005 at the two ring ports thereof. It should also be noted that since the ring status remains under the normal condition, the operation is merely continued.

Figure 13:
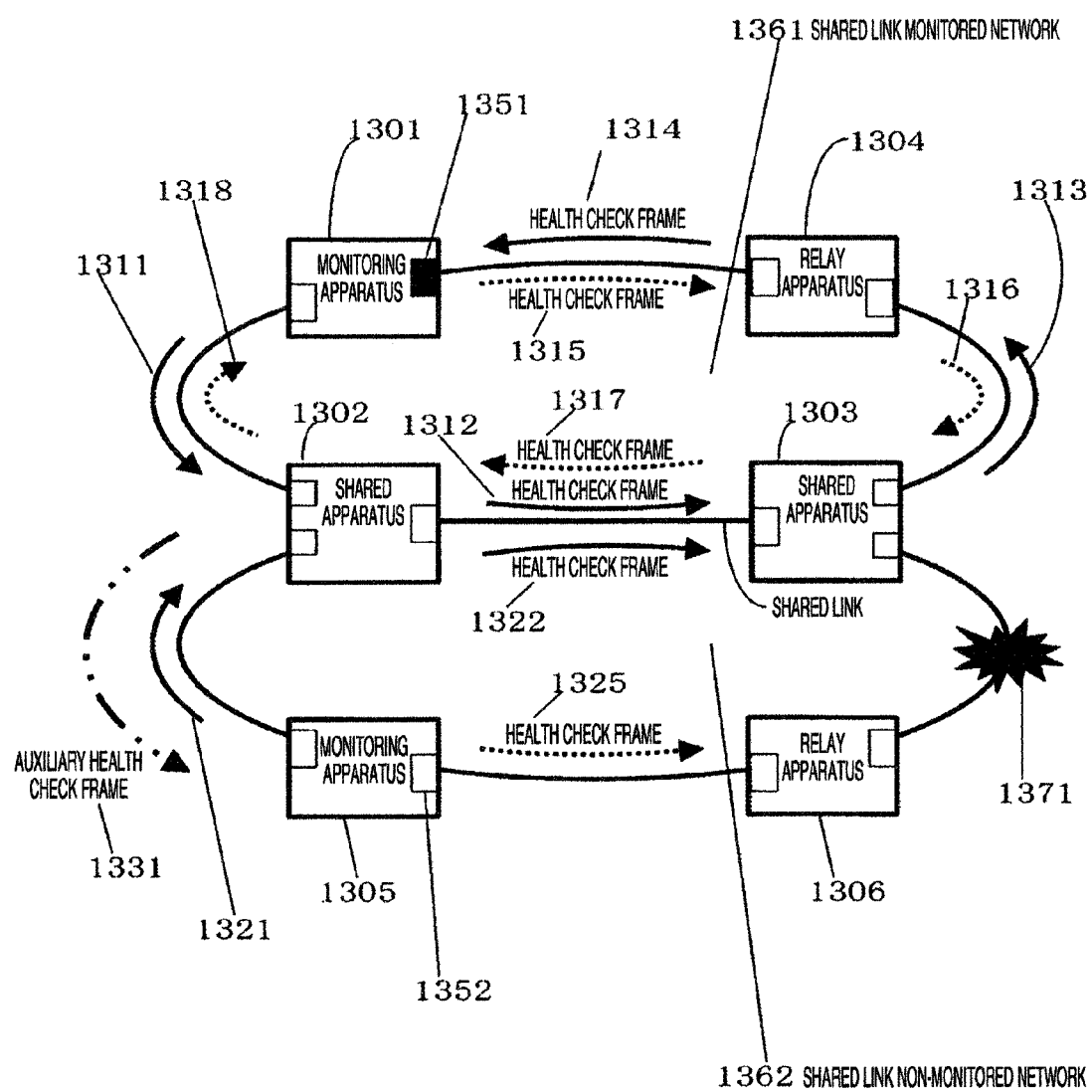
FIG. 13 is a structural diagram of a multi-ring network (having no shared link) with employment of the ring network constructing apparatus of the embodiment.

FIG. 13 indicates a condition that a failure 1371 occurs in the shared link non-monitored ring network 1062 of FIG. 10. When the failure 1371 happens to occur, a health check frame 1321 transmitted from a monitoring apparatus 1305 cannot be relayed from a relay apparatus 1306 to a succeeding apparatus. Similarly, a health check frame 1325 cannot be also relayed from a relay apparatus 1303 to a succeeding apparatus. As a result, the monitoring apparatus 1305 cannot receive the health check frames 1321 and 1325 at the two ring ports thereof. Also, an auxiliary health check frame transmitted from the shared apparatus 1303 cannot also be relayed from the relay apparatus 1306 to a succeeding apparatus. An auxiliary health check frame 1331 transmitted from the shared apparatus 1302 is received at the ring port of the monitoring apparatus 1305. As a result, since the health check frames 1321 and 1325 transmitted from the monitoring apparatus 1305 cannot be received at the two ring ports, and further, the auxiliary health check frame transmitted from the shared apparatus 1303 cannot be received at any one of the two ring ports, the monitoring apparatus 1305 judges that a ring status is under abnormal condition, and changes a ring port 1352 thereof into such a condition that a user frame can be transmitted/received. Also, the monitoring apparatus 1305 clears MAC address information which has been learned by receiving the user frame, and transmits a flush request frame from the two ring ports thereof with respect to other relay apparatuses 1302, 1303, and 1306. The relay apparatuses 1302, 1303, and 1306 which receive the flush request frame clear the MAC address information which has been learned by receiving the user frame. At this time, since the monitoring apparatus 1301 of the shared link monitored ring network 1361 has received the health check frame at the two ring ports, the monitoring apparatus 1301 judges that there is no change in the ring status, and the operation thereof is continued.

When the failure 1371 is recovered from the condition where the failure 1371 has occurred in FIG. 13 and then the failure condition is returned to the normal condition of FIG. 10, the monitoring apparatus 1005 receives any one of the health check frames 1021 and 1025 which are transmitted by the monitoring apparatus 1005 at the ring port. Otherwise, the monitoring apparatus 1005 receives the auxiliary health check frames 1031 and 1033 which are transmitted from the shared apparatuses 1002 and 1002 at the two ring ports respectively. As a result, the monitoring apparatus 1005 judges that the ring status becomes the normal condition, and again changes such a ring port where the transmission/reception of the user frame have been permitted into another condition that the user frame is not transmitted/received. Also, the monitoring apparatus 1005 clears the MAC address information which has been learned by receiving the user frame, and also, transmits a flush request frame from the two ring ports with respect to other relay apparatuses 1002, 1003, and 1006 in a similar manner when the failure 1371 occurs in FIG. 13. The relay apparatuses 1002, 1003 and 1006 which receive this flush request frame clear the MAC address information which has been learned by receiving the user frame. At this time, since the monitoring apparatus 1005 of the shared link monitored ring network 1061 continuously receives the health check frames at the two ring ports thereof, the monitoring apparatus 105 continues the operation thereof.

Figure 14:
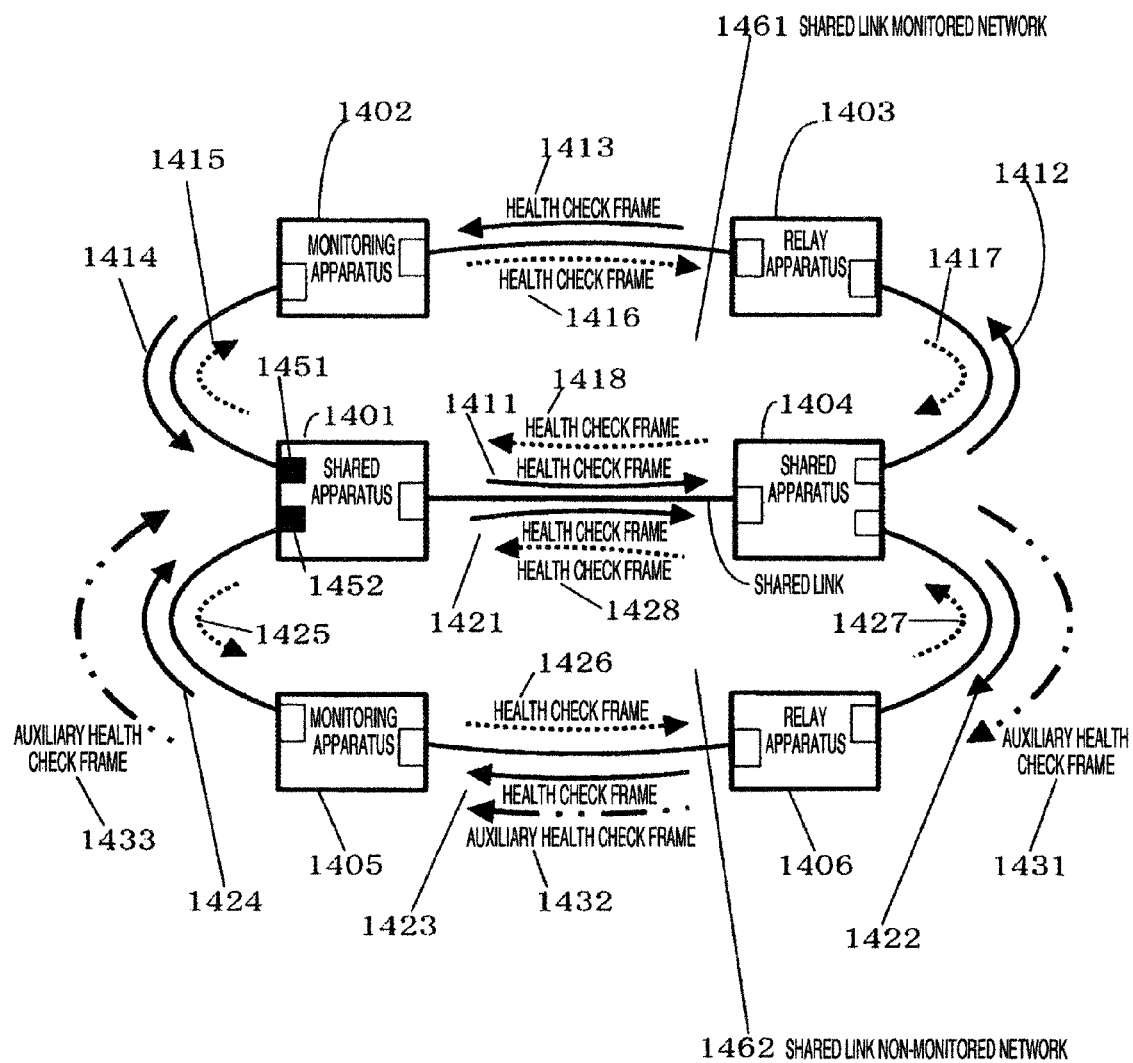
FIG. 14 is a structural diagram of a multi-ring network (having no shared link) with employment of the ring network constructing apparatus of the embodiment.

FIG. 14 shows a structure made in the case that a shared apparatus is used as a monitoring apparatus. Among apparatuses 1401 to 1404 of an embodiment of the present invention, which constitute a shared link monitored ring network 1461, a monitoring apparatus is defined as 1401, and relay apparatuses are defined as 1402 to 1404. Also, among apparatuses 1401, and 1404 to 1406 of the embodiment of the present invention, which constitute a shared link non-monitored ring network 1462, a monitoring apparatus is defined as 1401, and relay apparatuses are defined as 1404 to 1406. While the apparatus 1401 corresponding to the monitoring apparatus of each of the ring networks 1461 and 1462 constitutes one shared apparatus, this monitoring apparatus 1401 independently monitors the respective ring networks 1461 and 1462. The monitoring apparatus 1401 monitors a ring status as the monitoring apparatus for the shred link monitored network 1461, and sets a ring port 1451 to such a condition that a user frame is not transmitted and received. At the same time, the monitoring apparatus 1401 monitors a ring status as the monitoring apparatus for the shared link non-monitored network 1462, and sets a ring port 1452 to such a condition that a user frame is not transmitted and received. At this time, the ring ports 1451 and 1452 cannot be constituted as ring ports on the shared link side, but must be constituted as ring ports which are located opposite to the ring ports corresponding to the shared link. Also, since the monitoring apparatus 1401 of the shared link non-monitored ring network 1462 is commonly employed as the shared apparatus, the monitoring apparatus 1401 does not transmit such an auxiliary health check frame so as not to monitor the shared link, but monitors another auxiliary health check frame 1431 transmitted from another shared apparatus 1404 in combination with the health check frames 1421 and 1425 which are transmitted by the own shared apparatus 1401. As a result, similar to FIG. 10, the ring networks 1461 and 1462 can be independently operated.

In accordance with the monitoring apparatuses in the present embodiments, the shared apparatuses, and the relay apparatuses of the present invention, the below-mentioned effects can be achieved.

(1) In a monitoring apparatus which constitutes a ring network, the monitoring apparatus judges whether or not a relay of a user frame is permitted by determining whether or not a health check frame is received which is periodically transmitted. As a result, routes can be switched in a high speed.

(2) As previously described, since the monitoring apparatus may merely monitor a reception of a control frame, the system may be easily realized in a hardware fashion. As a result, while there is no unwanted protocol operation, loads given to a CPU can be reduced, so that a stable protocol operation can be realized.

(3) Health check frames are transmitted from two ring ports of a monitoring apparatus which constitutes a ring network, and these health check frames are monitored at the two ring ports (namely, health check frames are monitored in bidirectional manner). As a result, even when a failure happens to occur along one direction in a portion of the link which constitutes the ring network, it is possible to prevent an occurrence of a loop status in connection with the failure.

(4) In the case that a multi-ring network is constructed, the following conditions may be merely set: any one of a monitoring apparatus, a shared apparatus, and a relay apparatus may be merely set with respect to this apparatus, and which port may be merely set to a ring port. As a result, these monitoring apparatus, shared apparatus, and relay apparatus may be simply coupled to the multi-ring network. Also, since operations in the respective rings are independently carried out, a ring network may be readily added to be coupled to the existing ring network without giving an adverse influence to the existing ring network.

(5) In such a case that a multi-ring network is constructed, a structural position of a monitoring apparatus may be freely determined irrespective of such a fact whether or not an apparatus to be coupled takes a redundant structure, so that apparatuses may be arranged in a flexible manner. Also, the apparatus to be coupled is not necessarily a monitoring apparatus.

(6) In the case where a multi-ring network is constructed and an apparatus to be coupled takes a redundant structure, an auxiliary health check frame is transmitted from this apparatus having the redundant structure, and a monitoring apparatus monitors a health check frame in combination with this auxiliary health check frame. As a result, even when a failure happens to occur in a link between apparatuses which are made redundant, it is possible to avoid that a loop is constructed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A first communication apparatus to be coupled to a second communication apparatus and a third communication apparatus via a ring network, comprising:

a first port coupleable to the second communication apparatus via a link of the ring network; and a second port coupleable to the third communication apparatus via a link of the ring network;

wherein both the first port and the second port are set to send and receive a first control frame to and from the second communication apparatus and the third communication apparatus, to monitor a status for a link of the ring network between the first communication apparatus and either the second communication apparatus or the third communication apparatus, and either the first port or the second port is set to be disabled to relay a user frame during the normal status for a link of the ring network determined by a receipt of the first control frame on the first port and the second port.

2. The first communication apparatus according to claim 1, wherein when a failure is determined in the ring network, the first port and the second port is set to be able to relay a user frame.

3. The first communication apparatus according to claim 1, wherein:

when a status for a link of the ring network is monitored as a failure of the ring network, the first port and the second port is set to be able to relay a user frame, and when a status for a link of the ring network is monitored as a normal status, the first port is permitted to relay a user frame and the second port is not permitted to relay a user frame.

4. The first communication apparatus according to claim 1, wherein the first control frame includes information which indicates a status for a link of the ring network.

5. The first communication apparatus according to claim 1, further comprising a learning unit which learns MAC (Media Access Control) address information from the user frame; and after said status for a link of the network is changed from the normal, clears the MAC address information which has been learned by receiving the user frame.

6. The first communication apparatus according to claim 5, wherein the learning unit further transmits flush request frames from the first and second ports, while the flush request frames include an instruction that the MAC address information is cleared with respect to the second communication apparatus and the third communication apparatus.

7. A first node in a ring network including a second node and, a third node, comprising:

a first port which is set to send and receive a control frame for managing a link status of a ring network which is constituted by the first node, the second node and the third node and which is permitted to relay a user frame;

a second port which is set to send and receive a control frame for managing a link status of a ring network which is constituted by the first node, which is prohibited from relaying a user frame when a normal condition of a ring status of the ring network, and which is permitted to relay a user frame when a failure of the ring network is detected; and a learning unit that learns a MAC (Media Access Control) address on a basis of the relayed user frame.

8. The first node according to claim 7, wherein, when a failure of the ring network is detected, the learning unit further clears the MAC address information learned by receiving the user frame, and transmits flush request frames from the first and second ports, while the flush request frames instruct that the MAC address information is cleared with respect to the second node and the third communication apparatus.

9. The first node according to claim 7,
wherein, when a failure of the ring network is detected, the learning unit further transmits flush request frames from the first and second ports, while the flush request frames instruct that the MAC address information is cleared with respect to the second node and the third node.

10. A ring network system comprising:
a first node;
a second node coupled to the first node via a first link;
a third node coupled to the first node via a second link;
wherein:
the first node includes a first port to coupled to the ring network and a second port to coupled to the ring network both of which are set to send and receive a control frame for monitoring a status for link of the ring network system, to and from the second communication apparatus and the third communication apparatus, and either of which is set to be disabled to relay a user frame,
the first node learns MAC (Media Access Control) address information from the user frame, and
when the first node determines a failure of a ring network has occurred, both of the first port and the second port is set to be permitted to relay a user frame, and the first node clears the MAC address information learned by receiving the user frame.

11. The ring network system according to claim 10, wherein:
the second node and the third node learn MAC (Media Access Control) address information from the user frame,
the first node transmits a flush request to the second node and the third node via the first port or second port, and
the second node and third node clears MAC address information according to the flush request.

* * * * *